United States Patent

[11] 3,600,689

[72] Inventors Ian Carrodus Hutcheon Bedfordshire; Stephen Arthur Foster, Harlington; Kenneth Barton, Dunstable; Donald Louis Critten, Luton, all of, England

[21] Appl. No. 860,689

[22] Filed Sept. 24, 1969

[45] Patented Aug. 17, 1971

[73] Assignee George Kent Limited Luton, Bedfordshire, England

[54] ELECTRIC CONTROLLER WITH IMPROVED STABILIZER APPARATUS FOR THE STORAGE CAPACITOR

19 Claims, 11 Drawing Figs.

[52] U.S. Cl. .......... 328/127, 307/230, 328/1

[51] Int. Cl. .......... H03k 5/00

[50] Field of Search .......... 328/127, 128, 1; 307/230

[56] References Cited

UNITED STATES PATENTS

| | | | |
|---|---|---|---|
| 3,290,562 | 12/1966 | Faulkner et al. .......... | 328/127 |
| 3,290,563 | 12/1966 | Hyer et al. .......... | 328/127 |
| 3,374,362 | 3/1968 | Miller .......... | 328/127 |
| 3,381,230 | 4/1968 | Gilbert et al. .......... | 328/128 |
| 3,504,291 | 3/1970 | Gineste .......... | 328/1 |

*Primary Examiner*—Donald D. Forrer

*Assistant Examiner*—Harold A. Dixon

*Attorney*—Young and Thompson

ABSTRACT: For stabilizing a voltage stored on a memory capacitor, an electric controller has a generator providing a recurrent ramp wave form. Each time the ramp wave form voltage rises to a reference level, an oscillator is switched on to provide a series of sawtooth pulses, beginning always at a peak. The ramp wave form and the stored voltage are fed to a differential amplifier so that this has an output when ramp wave form voltage exceeds the stored voltage. The amplifier output is used to open a gate to allow part of one of the sawtooth pulses to be fed to the capacitor as a correction pulse, unless the sawtooth pulse is at zero when the gate opens. The stored voltage is thus first brought, if necessary, to a value corresponding to a zero value of the sawtooth pulse and is then stabilized at that value. The controller can operate either automatically or manually and the operation can be changed bumplessly and without balancing.

INVENTORS
IAN CARRODUS HUTCHEON
STEPHEN ARTHUR FOSTER
KENNETH BARTON
DONALD LOUIS CRITTEN
BY Young & Thompson
ATTYS.

INVENTORS

IAN CARRODUS HUTCHEON
STEPHEN ARTHUR FOSTER
KENNETH BARTON
DONALD LOUIS CRITTEN
BY Young + Thompson
ATTYS.

INVENTORS
IAN CARRODUS HUTCHEON
STEPHEN ARTHUR FOSTER
KENNETH BARTON
DONALD LOUIS CRITTEN
BY Young & Thompson
ATTYS.

INVENTORS

IAN CARRODUS HUTCHEON
STEPHEN ARTHUR FOSTER
KENNETH BARTON
DONALD LOUIS CRITTEN
BY Young & Thompson
ATTYS.

ELECTRIC CONTROLLER WITH IMPROVED STABILIZER APPARATUS FOR THE STORAGE CAPACITOR

The invention relates to an electric controller device in which means are provided for stabilizing a voltage.

In electric controller devices, it is desirable to store a voltage, sometimes for considerable lengths of time, for example, to maintain the controlled condition at a selected value or for use by a standby device to provide an output voltage if the main device fails.

It is accordingly the object of the invention to provide an improved electric controller device with voltage storage arrangements.

The invention accordingly provides an electric controller device having means for stabilizing a voltage on storage means in the device, the stabilizing means comprising a first generator for providing a first signal defining a recurrent time interval, a second generator for providing a pulse train of period substantially less than the time interval, the beginning of each time interval being synchronized with a first predetermined part of the pulse train, testing means for testing the pulse train at the end of the time interval to detect any difference between the part of the pulse train tested and a second predetermined part of the pulse train, the part of the pulse train tested being dependent on the voltage, and means responsive to any such detected difference to vary the voltage and thus the part of the pulse train tested in a sense to eliminate the difference.

The controller device of the invention preferably has means for providing at the output terminal thereof a control voltage obtained selectively from error signal means responsive to any difference between signals representing respectively a desired and a measured value of a condition to be controlled or from a manually adjustable signal source and a capacitor on which the control voltage is stored.

Such a device preferably includes arrangements for effecting bumpless balanceless transfer between manual and automatic operation for example of the kind described in U.S. Pat. application Ser. No. 739,292 now U.S. Pat. No. 3,523,193 issued Aug. 4, 1970.

In any controller device embodying the invention, the output or other voltage on the storage means will thus be changed if necessary by a small amount and the number of pulses corresponding to the time interval will then be fixed, as will the voltage. The duration of the time interval may be controlled by the stored voltage, the frequency of the pulse train being held constant. Alternatively the time interval may be held constant, the pulse train frequency then being controlled by the voltage.

In practice, the time interval is most conveniently defined by comparison of a monotonic ramp wave form with two reference levels one of which is dependent on the capacitor voltage. The pulse train, which preferably has a sawtooth wave form, can be provided by an oscillator arranged to start generating the pulse train at a fixed part of the cycle under control of the ramp wave form. Alternatively, the synchronization could be of the ramp wave form by the pulse train.

By way of example only, embodiments of the invention are described below with reference to the accompanying drawings, in which.

Figure 1:
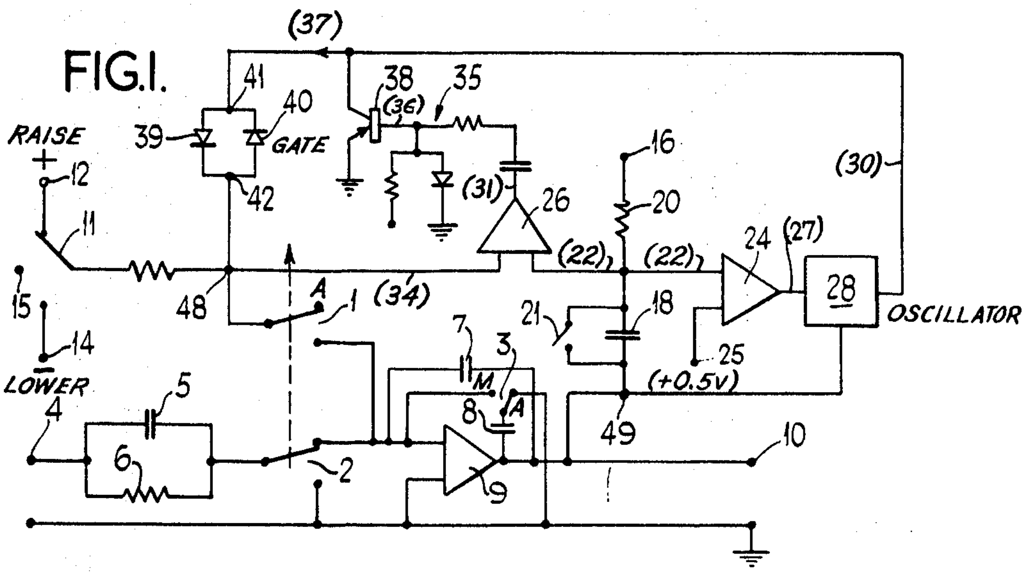
FIG. 1 is a circuit diagram of a first controller device according to the invention, the circuit being shown in simplified block form.
Figure 4:
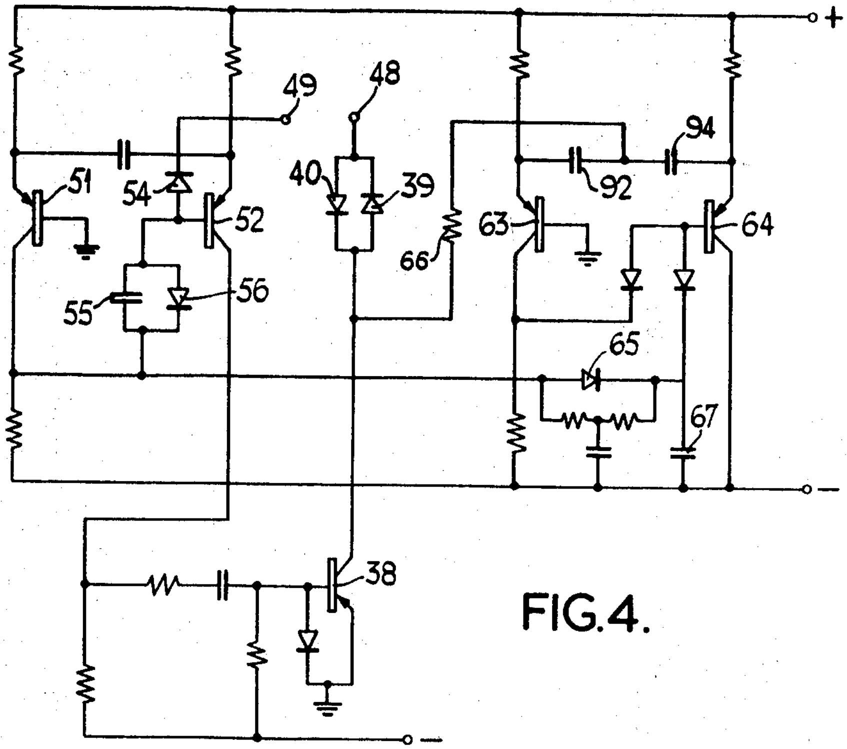
FIG. 4 is a circuit diagram showing an alternative form of a second part of the circuit of FIG. 1.
Figures 6, 7, 8:
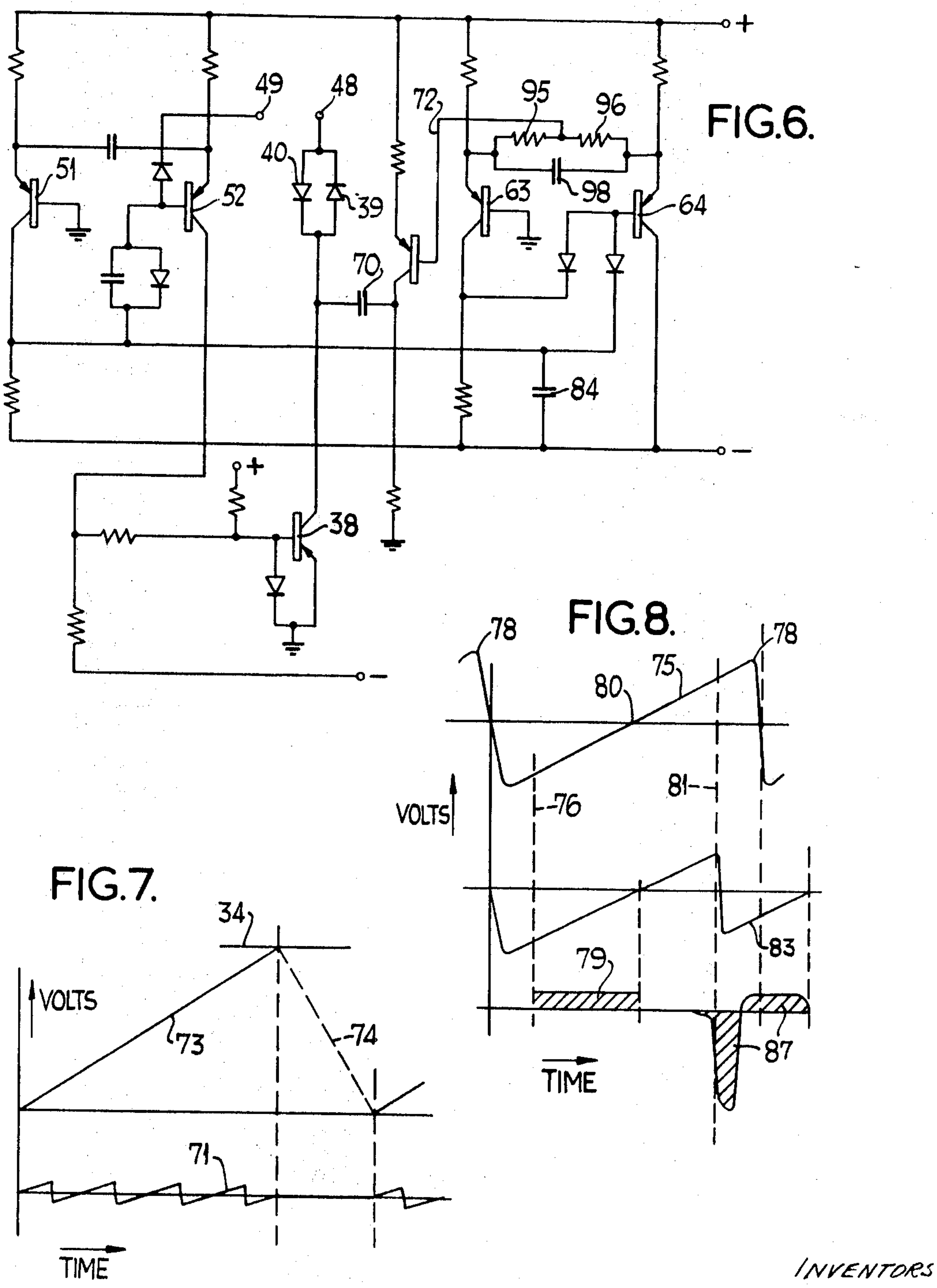
FIG. 6 is a circuit diagram of another alternative form of the second part of the circuit of FIG. 1.
Figure 9:
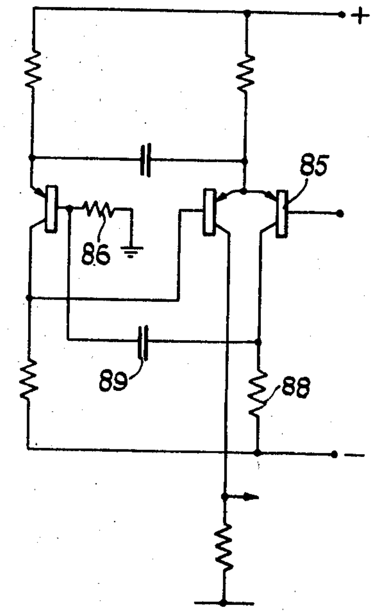
Figure 10:
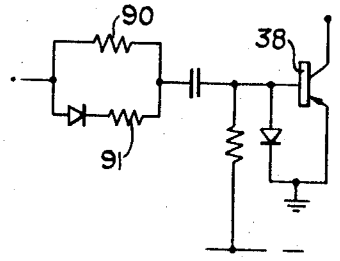

FIG. 7 and 8 both show wave forms appearing in the circuit of FIG. 6;

FIG. 9 shows an alternative form for a part of the circuits of FIGS. 1, 4 and 6;

FIG. 10 shows a possible modification to the circuits of FIGS. 4 and 6; and

Figure 11:
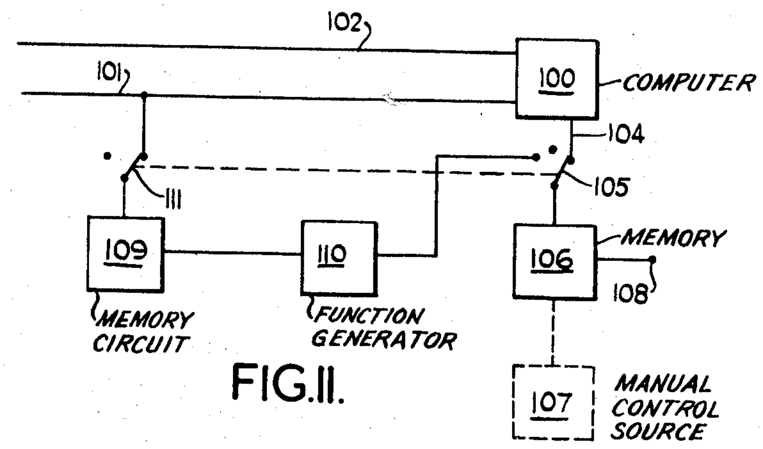

FIG. 11 is a circuit diagram in simplified block form of second controller device embodying the invention.

The circuit diagram of FIG. 1 shows a controller circuit incorporating capacitor means providing balanceless bumpless transfer between automatic and manual operation, in the manner described in the aforesaid U.S. Pat. application Ser. No. 739,292. In accordance with the invention, the inherent drift of the voltage stored on memory capacitor means during manual operation is eliminated by means of a voltage stabilizing or drift correction circuit as will be described.

The controller illustrated is of the two-term proportional plus integral type and can be switched from automatic to manual operation by movement of the relay contacts or ganged switches 1, 2, 3 from the automatic position (A) shown to the manual position (M). During automatic operation, any control error voltage received from the plant under control is applied to an input terminal 4 and causes current to flow through a capacitor 5 connected in parallel with a resistor 6 and through the switch 2 to a Miller integrator comprising an integrating capacitor 7 connected across an amplifier 9. A memory capacitor 8 is connected across the amplifier output in the automatic position by the switch 3. The amplifier output provides the desired proportional plus integral response at an output terminal 10.

Movement of the switch 3 to the manual position applies the output voltage on the capacitor 8 to the amplifier input, so the transfer is effected without the need for a balancing operation and without a bump or discontinuity of the output. During manual operation of the controller the output at the terminal 10 can be selectively raised or lowered by operation of a manual control switch 11 which has three positions. In the first or "raise" position, the switch 11 connects a positive voltage source 12 to one side of the capacitors 7 and 8, which are now in parallel, and in the second or "lower" position the switch applies a negative voltage from a source 14. In the third or "-hold" position corresponding to a switch terminal 15 the capacitors are disconnected from both sources and the drift correction circuit is effective to hold the existing voltage on the capacitor for an indefinite time. The amplifier input terminal connected to the capacitors is effectively at circuit earth through the amplifier input circuit so the capacitor 8 is still continuously charged to the output voltage. Movement of the switch 3 to the position shown, on return to automatic operation will thus again effect a bumpless and balanceless transfer. In a simpler form of the circuit, the switch 3 and the capacitor 8 can be omitted, the capacitor 7 then functioning as a memory capacitor. The circuit again provides bumpless balanceless transfer in either direction between manual and automatic operation.

Figure 2:
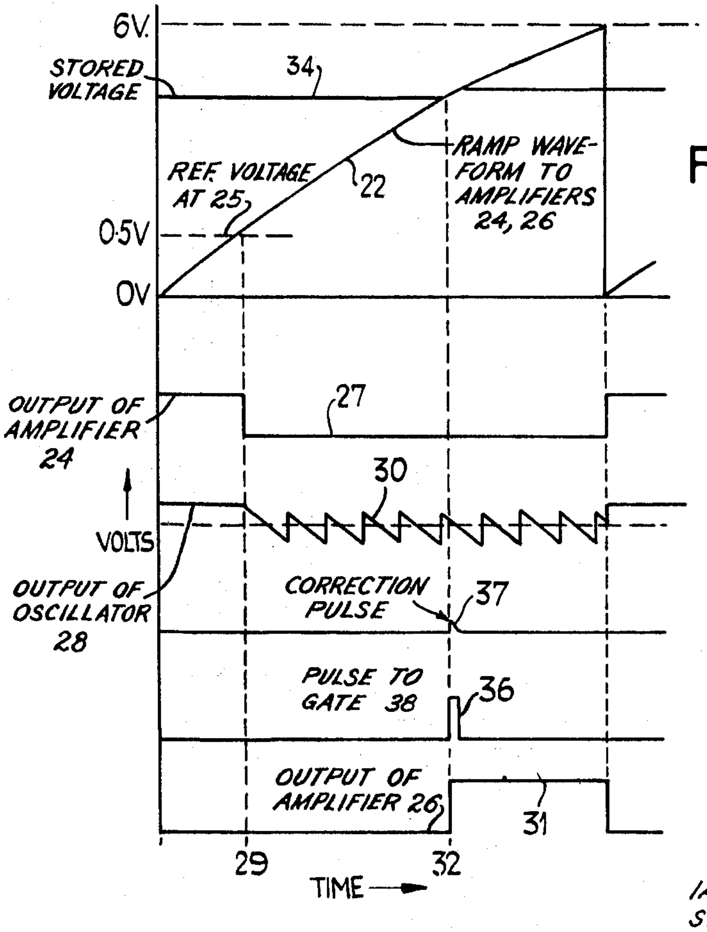
FIG. 2 shows various wave forms associated with the circuit of FIG. 1.

In the present circuit, the voltage to be stored on the capacitor 8 during manual operation has a value between +1 and +5 volts. The stabilizing circuitry associated with the capacitor 8 comprises a wave form generator energized by a positive voltage source at 16. The generator has the form of an RC integrator incorporating a capacitor 18 and a resistor 20 and provided with an automatic resetting switch 21. The generator provides a recurrent ramp wave form shown by the curve 22 in FIG. 2, in which voltage is plotted against time. The wave form 22 sweeps from 0 to 6 volts, that is, beyond the limits within which the stored voltage occurs. The wave form 22 is applied to two differential amplifiers 24 and 26. The amplifier 24 has as its second input a constant reference voltage of 0.5 volts applied at terminal 25 and its output 27 is applied to an oscillator 28. When the ramp wave form reaches a value exceeding 0.5 volts, at a time indicated on FIG. 2 at 29, the amplifier 24 provides an output which activates the oscillator 28 to provide a train of pulses 30 of sawtooth wave form, beginning at a peak, again as shown in FIG. 2. The oscillator 28 operates at a frequency such that it produces a plurality of cycles during the rise time of the ramp wave form 22.

The amplifier 26 derives its second input from the capacitor 8 through the switch 1 when this is in the position for manual operation. The amplifier 26 thus produces an output 31 at a later point in the ramp wave form 22 corresponding to a time 32 at which the wave form exceeds the voltage 34 on the capacitor. In the arrangement illustrated, the amplifier 26 need not have a very low input current, or offset, as this current does not flow into the capacitor 8. The output of the amplifier 26 is supplied to a gate pulse generator 35 which can be of the simple form shown. The generator output pulse 36 controls a gate 38 by which is controlled the application of the output of the oscillator 28, as a correction pulse 37 to the capacitor 8. The correction pulse is fed to a point which is at virtual earth so that the gate 38 can be constituted as shown by a normally closed shunt gate in the form of a transistor switch. When the gate 38 is closed, the voltage across it would not exceed 100 mv. and to prevent this and any voltage offset on the amplifier 26 from causing a significant current leak into the Miller integrator, two silicon diodes 39, 40 are included in parallel paths between points 41, 32 in the path of the correction pulse. The diodes pass very little current at forward voltage drops up to 100 mv. or more.

Figure 3:
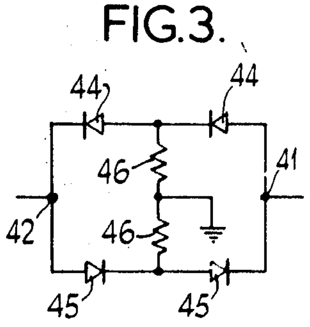
FIG. 3 is a circuit diagram showing an alternative form for a part of the circuit of FIG. 1.

If necessary, two pairs of diodes 44, 45 can be used in each of the parallel paths between the points 41, 42 with resistors 46 leading to earth if required, to remove leakage currents in the first of each, as shown in FIG. 3. The maximum voltage across the gate 38 when open is low because of the virtual earth so that its transistor can be turned on and off by a small change in the voltage applied to its base, which minimizes switching transients due to the capacitance of the transistor.

If the oscillator output wave form happens to be zero at the time 32 at which it is tested, the closure of the gate 38 will have no effect on the capacitor voltage 34 and the sequence of events will be repeated until leakage in the capacitor 8 reduces the voltage thereon so that the oscillator wave form is not zero at this time 32. When this occurs, the closure of the gate 38 means that the correction pulse 37 derived from the oscillator 28 is applied to the capacitor 8. This pulse slightly modifies the voltage 34. This correction is continued if need be until the voltage 34 is restored to a value such that occurs at a time when the oscillator wave form 30 is zero.

Normally, the oscillator wave form 30 will not be zero at the first test time 32 and the voltage 34 is then modified until it is at each subsequent test time 32. Normally therefore, the time 32 is moved towards the nearest zero of the wave form 30 and is then locked in this position, the voltage 34 being held at the corresponding level. In other words the voltage 34 is held constant indefinitely after any necessary minor change initially.

The minor initial change depends on the resolution of the circuit, defined as the change in the voltage 34 corresponding to the time between adjacent lock-in points on the oscillator wave form 30, that is, the time of 1 cycle. If a full scale change of the voltage 34 corresponds to 500 cycles of the oscillator wave form, the resolution corresponds to 0.2 percent of full scale and the circuit of FIG. 1 imposes a maximum initial change of +0.1 percent of full scale.

The correction pulse 37 can be either positive or negative and its magnitude is proportional to the time difference between the time 32 and the lock-in point on the sawtooth wave form. Preferably the correction applied to the voltage 34 is rather less than is necessary to bring the time 32 to the lock-in point so that this point is approached in an "overdamped" or "dead beat" manner.

If the anticipated drift of the stored voltage 34 is in one direction only, the circuit can be simplified to provide unidirectional correction. Correction for drift is obtained at the end of each time interval up to the maximum correction available; this might in practice be rather less than +0.1 percent of full scale per ramp cycle, which is ample.

The pulse train or oscillator wave form 30 can have any shape but the shape shown in FIG. 2 provides correction proportional to deviation but needs a narrow pulse, that is, short closure of the gate 38 for best results.

The ramp wave form 22 must be monotonic over the portion used, which can be extended on either side of the expected range within which the stored voltage 34 will fall by any amount, but is not otherwise limited as to shape. The circuit does not depend for its operation on the repeatability with which the ramp is reset and resetting can therefore be effected with a relatively unstable device, for example, a unijunction transistor. Stability at least between ramp cycles is however required in the ramp rate, the 0.5V reference voltage, the frequency of the oscillator 28 and the synchronization between the oscillator and the ramp wave form. The amplifiers 24, 26 should be of high gain, but the gain need not be stable. The circuit cannot of course distinguish between different cycles of the pulse train but even if the vital parameters do change, the voltage to be stored will normally not be lost but will only be slightly modified. FIG. 4 shows a modified voltage stabilizing device embodying the invention, which can replace the components shown in the upper part of FIG. 1 between the connection points 48 and 49. Like parts in FIG. 4 receive the same reference numerals as in FIG. 1.

Figure 5:
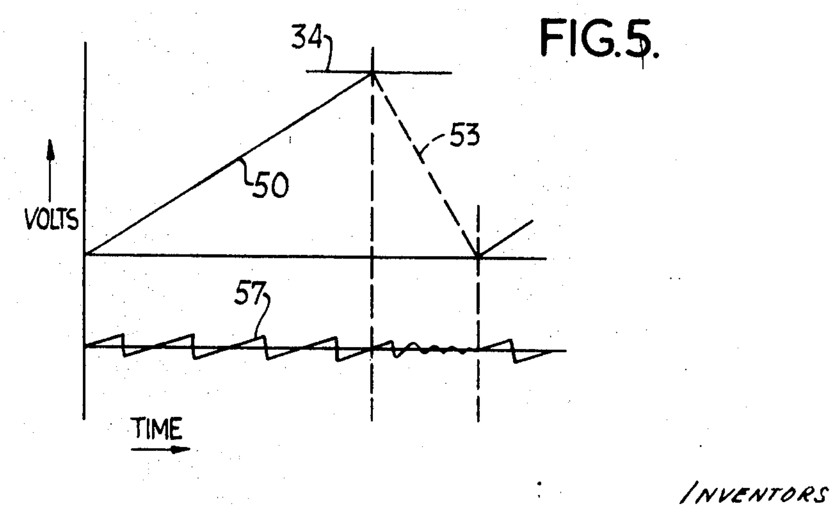
FIG. 5 shows wave forms appearing in the circuit of FIG. 4.

In this circuit a ramp wave form 50 shown in FIG. 5 is produced by a slow oscillator incorporating a pair of transistors 51 and 52 and is followed by a declining reset ramp 53, as shown in FIG. 5, of significant duration, for example, about one-fourth of the whole cycle.

The operative ramp portion of the output or timing ramp 50 is obtained with the transistor 51 conducting and the emitter on the transistor 52 going positive. When this emitter reaches the desired voltage 34 stored on the capacitor 8 and supplied through a diode 54 from the connection point 49 to the base-emitter junction, the timing ramp ends. The collector of the transistor 51 may be positive with respect to the base of the transistor 52 and a capacitor 55 is provided to ensure instantaneous positive feedback and rapid switchover at the end of the timing ramp, if the self-capacitance of a diode 56 in parallel therewith is not sufficient.

The oscillator, which provides a pulse train 57, comprises transistors 63 and 64. The transistor 63 is set into oscillation at the start of the timing ramp 50 by a positive potential on the collector of the transistor 51 which also switches off the transistor 64, through diode 65. At the end of the timing ramp, the collector the transistor 51 will go negative and will turn off the oscillator gradually by carrying the base of the transistor 64 with it. The rate at which the oscillations 57 cease is such that the fast oscillator completes the cycle in progress without too much degradation but stops completely during the reset period of the slow oscillator. The collector of the transistor 52 goes positive at the end of the timing ramp 50 to operate the gate 38 briefly, to apply to the capacitor 8 any correction pulse, which is of course obtained from the fast oscillator output. The pulse is taken through resistor 66 and the two antileakage diodes 39, 40. A capacitor 67 prevents the transmission of spikes from the fast oscillator to the slow one. If necessary, some resistance can be included in series with a diode 65 to assist this decoupling.

FIG. 6 shows a modified form of the circuit of FIG. 4 in which a low value capacitor 70 is provided in the fast oscillator output line 72, so that the far side of this capacitor follows this output fairly closely. The slow oscillator or ramp wave form generator again produces a timing ramp 73, shown in FIG. 7, with a reset ramp 74 of substantial duration. At the end of the timing ramp, the fast oscillator is stopped by positive potential on the collector of the transistor 51. This, and the generation of the correction pulse, can occur in either of two ways which will be described with reference to the upper and lower lines of FIG. 8 respectively.

The fast oscillator may happen to be producing its ascending ramp 75 on the line 72 when the collector of the transistor 51 goes negative, at time 76, in which event the transistor 64 remains conducting and the ramp reaches its normal end point 78, at which the transistor 63 becomes conductive and the oscillator is stopped. A correction pulse 79 will have been delivered to the storage capacitor 8 through the capacitor 70. The pulse is proportional to the deviation from the lock-in point 80 and is in this case negative.

The fast oscillator may however be producing its second ramp 83 when the collector of the transistor 51 goes negative at time 81, in which event the transistor 63 is conducting and transistor 64 is off when the collector the transistor of 51 goes negative. This causes the transistor 64 to be turned on immediately and the transistor 63 to go off. The emitter of the transistor 63 then goes positive to its normal conclusion point at which the transistor is again conductive. In the meantime, a double correction pulse 87 has been applied to the memory capacitor through the capacitor 70, the net value of the pulse being in this case positive. The correction pulse is again proportional to deviation from the lock-in point.

In the circuit of FIG. 6, it is essential that the gate 38 should open before a correction pulse occurs. To ensure this, a capacitor 84 is provided to introduce a small repeatable delay on the starting and stopping process; this delay can be increased to a significant fraction of the fast oscillator cycle without upsetting operation. Increasing the delay also broadens the positive part of the double correction pulse and reduces its peak height. The capacitor 84 also prevents interaction between the two oscillators. The time at which the gate 38 closes is not critical.

FIG. 9 shows a possible modification of the oscillators of the circuits of FIG. 4 and 6 in which a third transistor 85 replaces the gating diodes. Resistors 86 and 83 and a capacitor 89 are included to ensure instantaneous positive feedback at the end of the timing ramp.

To prevent the possibility of permanent loss of the desired voltage, new spurious operation by short term instabilities, such as noise, the value of the circuit components are chosen so that the correction applied to the memory capacitor on each operation is only a small part of the maximum safe value. Moreover, the gate circuit is preferably so arranged that after having been open for a brief period to pass a correction pulse to the memory capacitor, it will not again open until after a predetermined interval. FIG. 10 shows a device provided in the base circuit of the transistor constituting the gate 38, which includes parallel arms including a high value resistor 90 and a low value resistor 91 respectively. This device makes it impossible for spurious operation to occur more than a limited number of times during each slow oscillator cycle.

All components and supply voltages preferably have good short term stability, for example, so as to be free from noise and the like. Interaction between the oscillators must be prevented, for example, by the capacitive decoupling 84 shown in FIG. 6. Resistive or inductive decoupling can of course be employed. In the circuits of FIGS. 4 and 6, the positive step of the collector of the transistor 51 must always be greater than that of the collector of 63 so as not to interfere with the operation of the fast oscillator.

The circuits of FIGS. 4 and 6 can employ oscillators with inverted circuits to use NPN transistors or oscillators of kinds other than the emitter-coupled multivibrator type shown, employing for example two timing capacitors. Moreover, the fast oscillator could be stopped in other ways. It will be noted that both fast oscillators provide a sawtooth output wave form, that of FIG. 4 by splitting the timing capacitor into two capacitors 92 and 94 and that of FIG. 6 by a center tapped resistor network with resistor 95, 96 across a single capacitor 98.

According to a further feature of the invention, virtual immunity from the effects of power supply failures can be obtained by ensuring that these do not cause the memory capacitor 8 to be discharged. Thus for example a relay placed in series with the capacitor can be arranged to open in response to a power failure drop of more than a predetermined amount and to close again when the power supply is reestablished. The stored voltage will then drift in accordance with the characteristics of the capacitor, normally at about 1 percent per hour, so that for short power failures no substantial change is involved.

The modified electric controller device shown in FIG. 11 incorporates a computer 100 to which are supplied on lines 101 and 102 signals representing respectively the measured value and the desired value of the condition to be controlled. The computer 100 supplies a digital control output for effecting raising or lowering of regulator controlling the condition on an output line 104, the output being carried through a two position switch 105 to a memory circuit 106 from which the output of the device is supplied to an output terminal 108. To provide the alternative of manual operation, a manually adjustable signal source 107 can be provided for connection to the memory 106, the switch 105 then disconnecting the memory 106 from the rest of the circuit.

As a standby for use in the event of failure of the computer 100, the controller device includes a second memory circuit 109 associated with a function generator 110. The measured value signal is supplied during normal operation of the device to the function generator 110 through a second switch 111 and the second memory circuit. The output of the function generator is provided on line 114 to the terminal of the switch 105 to which no connection is normally made.

The switches 105 and 111 are arranged to change positions in response to failure of the computer, so that the measured value signal at the level at the moment when failure took place is stored in the memory 109. The memory 109 incorporates a capacitive storage means associated with a stabilizing device as described above and will therefore hold this value indefinitely. The change of position of the switch 105 disconnects the computer output from the memory 106 and supplies the output of the function generator 110 instead. The controller output at the terminal 108 will thus be derived from the stored value of the measured signal until normal operation by way of the computer 100 can be resumed. It will be evident that instead of storing the measured value signal at the instant of failure for use while the computer cannot operate, the desired value signal could be stored in the memory 109.

It will be understood that the controller devices described and illustrated are provided to illustrate and not to limit the invention. Various alternative arrangements may be made by those skilled in the art without departing from the scope of the invention which is limited only by the claims appended hereto.

We claim:

1. An electric controller device having means for stabilizing a voltage on storage means in the device, the stabilizing means comprising a first generator for providing a first signal defining a recurrent time interval, a second generator for providing a pulse train of period substantially less than the time interval, means for synchronizing the beginning of each time interval with a first predetermined part of the pulse train, testing means for testing the pulse train at the end of the time interval to detect any difference between the part of the pulse train tested and a second predetermined part of the pulse train, the part of the pulse train tested being dependent on the voltage, and means responsive to any such detected difference to vary the voltage and thus the part of the pulse train tested in a sense to eliminate the difference.

2. A device as claimed in claim 1 having main controller means arranged to supply a control output in response to any difference between signals representing desired and measured values of the condition to be controlled and standby means comprising a memory device and the stabilizing means, the standby means being operative in the event of failure of the main controller means to supply a control output derived from one of the desired and the measured value signals at the moment of failure.

3. A device as claimed in claim 2 in which the main controller means is a computer device arranged to supply a digital control output.

4. A device as claimed in claim 1 having means to prevent variation of the voltage on the storage means until a predetermined time has elapsed since the last variation of the voltage.

5. A device as claimed in claim 1 in which the signal provided by the first generator comprises a monotonic ramp wave form and in which means is provided for starting the generation of the ramp wave form and the pulse train together.

6. A device as claimed in claim 5 having means for testing the pulse train and stopping generation of the pulse train when the ramp wave form equals the control voltage.

7. A device as claimed in claim 6 in which the signal provided by the first generator includes a reset portion following the testing of the pulse train, the duration of said reset portion being a substantial part of the duration of the ramp wave form.

8. A device as claimed in claim 1 in which the signal provided by the first generator comprises a monotonic ramp wave form spanning the expected range of the voltage on the storage means.

9. A device as claimed in claim 8 having means for comparing the ramp wave form with a reference voltage and means for starting generation of the pulse train when the ramp wave form equals the reference voltage.

10. A device as claimed in claim 8 having a gate and means for operating said gate to apply a correction pulse obtained from the pulse train when the ramp wave form equals the control voltage.

11. A device as claimed in claim 10 in which the pulse train has a sawtooth wave form and in which means is provided for varying the control voltage by a correction pulse obtained from the pulse train.

12. A device as claimed in claim 9 having a first differential amplifier and means for applying the reference voltage and the ramp wave form to respective inputs of the differential amplifier, the amplifier output being arranged to render effective an oscillator constituting the second generator.

13. A device as claimed in claim 9 in which the pulse train is arranged to be tested when the ramp wave form equals the control voltage.

14. A device as claimed in claim 13 having a second differential amplifier and means for applying the control voltage and the ramp wave form to respective inputs of a second differential amplifier, the amplifier output being arranged to cause the variation of the control voltage.

15. A device as claimed in claim 1 having error signal means responsive to any difference between signals representing respectively a desired and a measured value of a condition to be controlled, a manually adjustable signal source, capacitor means constituting the storage means, and means for providing at an output terminal of the device a control voltage obtained selectively from the error signal means or from the manually adjustable source, the stabilizing means being arranged to stabilize the control voltage on the capacitor means.

16. A device as claimed in claim 15 having a relay in series with the capacitor on which the voltage is stored, the relay being arranged to open during a drop in the voltage of the power supply to the device to below a predetermined value.

17. A device as claimed in claim 15 including arrangements whereby a change between the automatic and the manual outputs can be effected in a bumpless balanceless manner.

18. A device as claimed in claim 17 wherein said arrangements comprise an amplifier having an output terminal constituting the output terminal of the device, first and second input terminals, an input circuit between the first input terminal and the second input terminal and means connecting the second input terminal to circuit earth, an integrating capacitor, means connecting the integrating capacitor across the amplifier in a negative feedback configuration, and switch means having a first position in which the control voltage is obtained from the error signal means and in which said capacitor means is connected between the output terminal and circuit earth, and a second position in which the control voltage is obtained from the manually adjustable source and in which said capacitor means is connected in parallel with the integrating capacitor and the amplifier.

19. A device as claimed in claim 17 wherein said arrangements comprise an amplifier having an output terminal constituting the output terminal of the device, first and second input terminals, an input circuit between the first input terminal and the second input terminal, and means connecting the second input terminal to circuit earth, means connecting said capacitor means across the amplifier in a negative feedback configuration, and switch means having a first position connecting the error signal means to the first input terminal for automatic operation and a second position connecting the manually adjustable signal source to the first input terminal for manual operation.